United States Patent [19]

Pinand

[11] Patent Number: 5,024,565

[45] Date of Patent: Jun. 18, 1991

[54] HAND TOOL

[76] Inventor: Henry Pinand, 80 Upper Hibernia Rd., Rockaway, N.J. 07866

[21] Appl. No.: 569,203

[22] Filed: Aug. 20, 1990

[51] Int. Cl.$^5$ .................. B23B 45/06; B25B 15/06
[52] U.S. Cl. .................. 408/121; 74/127;
    81/57.42; 81/DIG. 2; 408/125; 408/139
[58] Field of Search ........... 408/124, 125, 120, 121,
    408/139; 81/57.42, 57.45, DIG. 2; 74/127

[56] References Cited

U.S. PATENT DOCUMENTS

| 1,744,921 | 1/1930 | Robarts . | |
| 1,937,645 | 1/1933 | Fegley et al. | 145/62 |
| 2,337,514 | 12/1940 | Wilcox | 145/62 |
| 2,354,735 | 8/1944 | Bensinger | 408/125 |
| 2,421,901 | 6/1947 | Murad et al. | 81/57.42 X |
| 2,646,687 | 6/1951 | De Wald | 74/127 |
| 2,947,334 | 8/1960 | Issartel | 74/127 |

Primary Examiner—Steven C. Bishop
Attorney, Agent, or Firm—Thomas L. Adams

[57] ABSTRACT

A hand tool can remove burrs from an aperture in a workpiece. The tool has a hollow handle and a shaft rotatably mounted in the handle to reciprocate axially therein. The tool has a thruster for urging the shaft to extend axially. A rider is mounted in the handle for engaging and rotating the shaft as it extends axially from the handle. This rider can allow axial retraction of the shaft into the handle without rotation. A deburring bit (e.g. a countersink bit) is mounted at an outer end of the shaft. Thus the bit turns when the shaft extends as the handle withdraws from the workpiece.

14 Claims, 1 Drawing Sheet

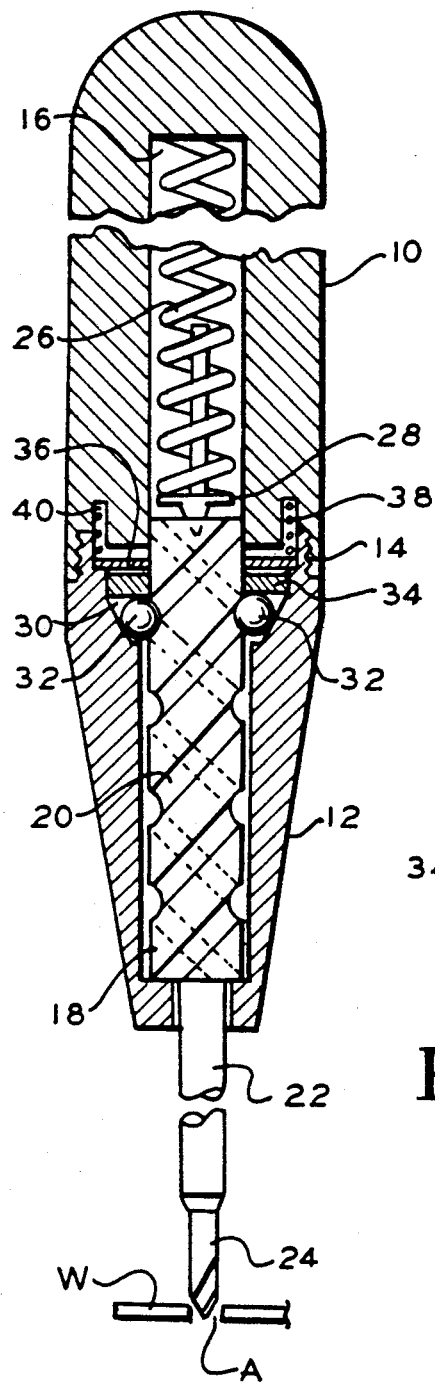
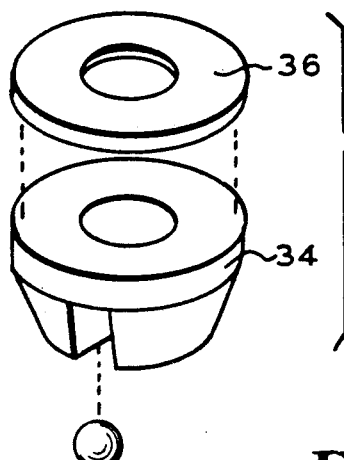
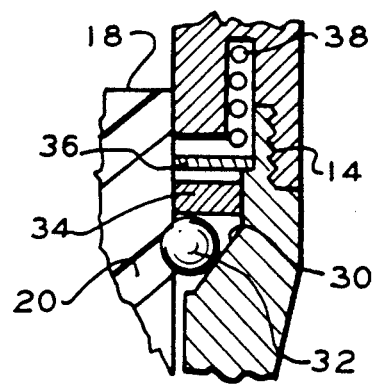
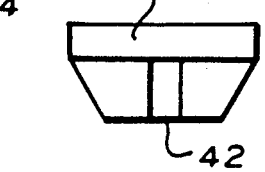
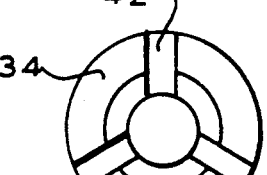
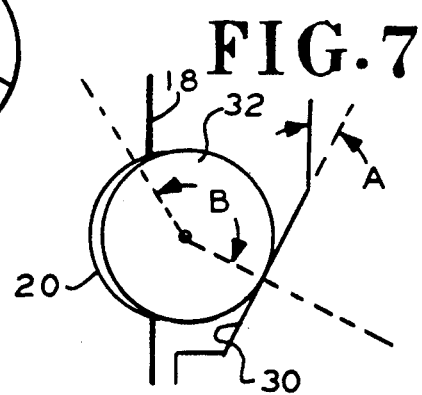
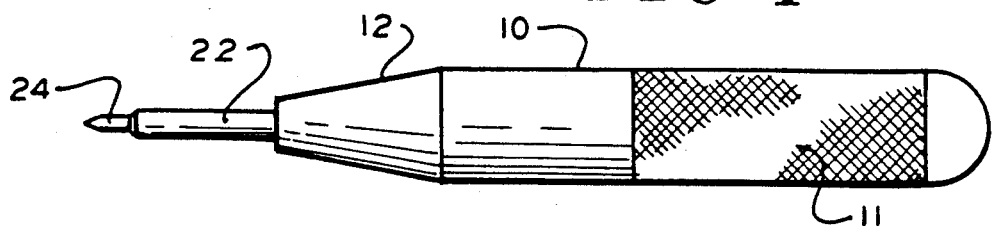

HAND TOOL

BACKGROUND OF THE INVENTION

The present invention relates to hand tools for removing burrs, from a drilled hole and in particular, to tools that rotate as a handle is reciprocated and a shaft retracts and extends.

After drilling a hole, a machinist will routinely insert and twist a deburring tool in the hole. While the hand tool is quick because it is self-centering, manual operations on many holes can be fatiguing and produce inconsistent results. Alternatively, a drill press fitted with a deburring tool can be carefully centered over the hole and carefully pressed into the hole to be deburred. A drill press, however, is not self-centering and can produce excessive pressure that enlarges the hole unacceptably. Either operation is tedious and time consuming.

A known screwdriver (sometimes referred to as a "Yankee" screwdriver) has a shaft with axial grooves and a hollow handle. When pushing the handle towards a workpiece, a key inside the handle can ride on a spiral groove and turn the shaft and drive a screw. These known hand tools have a reversible setting so the tool can rotate in either direction. These known hand tools turn their shaft typically when the handle is thrust towards the workpiece and the spirally grooved shaft retracts into the handle.

If "Yankee" screwdrivers were fitted with a deburring tool, they would not operate satisfactorily. Such a screwdriver normally turns when the handle is pressed towards the workpiece and the shaft retracts. Consequently, the lightest amount of pressure occurs at the beginning of the deburring stroke, followed by pressure that gradually increases to the maximum at the end of the stroke when the shaft is fully retracted into the handle. This operation is precisely the opposite of what is needed. The pressure should decrease during the cutting cycle so the countersink will gradually stop cutting, and begin smoothing and polishing the chamfered surface. Applying maximum pressure at the end of the deburring stroke tends to finish the stroke with gouges left by the deburring tool itself.

The screwdriver shaft in U.S. Pat. No. 2,646,687 can idle when the handle is pushed towards the workpiece but rotate as the handle withdraws and the shaft extends from the handle. This reference, however, does not suggest using a deburring tool instead of a screwdriver blade. Furthermore, the reference does not suggest setting the shaft pitch and setting the springs so the decreasing pressure stops the cutting action and smooths the chamfered surface, thus enhancing its deburring capability. See also U.S. Pat. Nos. 1,744,921; 1,937,645; and 2,337,514.

Accordingly, there is a need for a simple deburring hand tool that is self-centering, self-contained, and that decreases its pressure toward the end of the operating stroke to smooth the aperture without leaving gouges.

SUMMARY OF THE INVENTION

In accordance with the illustrative embodiments demonstrating features and advantages of the present invention, there is provided a hand tool for removing burrs from an aperture in a workpiece. The hand tool has a hollow handle and a shaft rotatably mounted in the handle to reciprocate axially therein. The tool has a thrust means for urging the shaft to extend axially. Also included is a rider means mounted in the handle for engaging and rotating the shaft as it extends axially from the handle. This rider means is operable to allow axial retraction of the shaft into the handle without rotation. The hand tool also has a deburring bit mounted at an outer end of the shaft. Thus the bit turns when the shaft extends as the handle withdraws from the workpiece.

By employing apparatus of the foregoing type, a relatively simple and efficient deburring hand tool is achieved. In a preferred embodiment, a spirally grooved shaft is spring loaded into a hollow handle to axially reciprocate therein. The grooves of the shaft comprise preferably three starts. The shaft is surrounded by a frustro-conical race holding three ball bearings. The ball bearings are kept equidistantly spaced by an annular spacer having three notches for positioning the balls.

The preferred hand tool has an annulus shaped like a washer and positioned at an annular shelf located on the side of the spacer that is distal to the ball bearings. The shelf restricts the closing motion of the annulus and ensures that it leaves clearance for the spacer and ball bearings to allow them to rotate freely. A preferred spring driving the annulus tends to keep the spacer and ball bearings down in the race and adjacent to the spiral grooves.

Thus the grooved shaft can retract into the hollow handle and ratchet past the ball bearings, which skip from groove to groove. On the reverse stroke, the balls move toward the narrow part of the annular race and fall into the spiral grooves to engage and rotate the shaft.

Tools according to the foregoing principles can be hand held and easily used at a bench or workstation. Also machine set-up is unnecessary and there is no need to change any settings for holes of different size or heights. The tool can produce a smooth burrless chamfer. By using an appropriate bit, a consistent countersunk depth is achieved from hole to hole. The tool can be used quickly and therefore saves a significant amount of time. The tool is also easily operated and no special training is needed for efficient operation. Also the depth of the deburring can be altered by repeating the cycle.

BRIEF DESCRIPTION OF THE DRAWINGS

The above brief description as well as other objects, features and advantages of the present invention will be more fully appreciated by reference to the following detailed description of presently preferred, but nonetheless illustrative embodiments in accordance with the present invention, when taken in conjunction with the accompanying drawings wherein:

FIG. 1 is a side view of a hand tool according to the principles of the present invention;

FIG. 2 is an axial sectional view of the hand tool of FIG. 1;

FIG. 3 is an exploded view of the holding means and rider means of FIG. 1;

FIG. 4 is an edge view of the spacer illustrated in FIG. 3;

FIG. 5 is a bottom view of the spacer illustrated in FIG. 4;

FIG. 6 is a detailed view of a portion of the hand tool of FIG. 2; and

FIG. 7 is a detailed view of the ball of FIG. 6 and its immediate environment.

DETAILED DESCRIPTION OF THE PREFERRED EMBODIMENTS

Referring to FIGS. 1 and 2, a handle is shown composed of a cap 10 and collar 12. The outer surface of cap 10 is shown with knurling 11. Cap 10 is a hollow, cup-shaped object; whereas collar 12 is a sleeve tapering toward an inward flange. Cap 10 is attached to collar 12 by means of threads 14. Preferably, the handle 10, 12 is one inch in diameter and six inches long while the tool has an overall length of eight and half inches. The handle 10, 12 is shown having a knurled exterior, but in some embodiments the outside surface can fluted or hexagonal to increase the gripping strength.

Mounted in hollow 16 of cap 10/collar 12 is shaft 18, shown herein with a spirally grooved section having two right handed starts 20. Two starts are shown for illustrative purposes but it will be appreciated that the preferred number of starts is at least three. Shaft 18 has an integral shank 22 ending in a hollow tip fitted with a deburring tool 24, shown herein as a single fluted bit. The term deburring bit includes bits specially designed for deburring or may be in some embodiments a conventional countersink bit. Bit 24 is forced fitted into the hollow tip of shank 22 and can therefore be replaced when worn or damaged. Collar 12 has a frustro-conical outer surface and a hollow cylindrical interior bordered by an annular flange which converges around shank 22 to keep shaft 18 within collar 12.

A thrust means is shown herein as a helical compression spring 26 mounted between the floor of hollow 16 and a disk-shaped anvil 28 having a pointed tip that fits into a complementary dimple in the inside end of shaft 18. Anvil 28 has a rear extension that acts as a stop to limit the motion of shaft 18 and prevent a deforming compression of spring 26. Consequently, shaft 18 can spin around anvil 28 and can also retract into handle 10, 12 as spring 26 is compressed.

The cylindrical hollow in the center of collar 12 diverges into a frustro-conical race 30. A rider means is shown herein as a pair of ball bearings 32 at diametrically opposed positions in race 30. A tapered annular spacer 34 has three notches embracing balls 32. Mounted along the side of spacer 34 distal to balls 32 is a holding means shown herein as an annular holder 36, a washer-shaped annulus. Annulus 36 has a diameter greater than that of spacer 34 to prevent annulus 36 from entering into the race area where spacer 34 resides. Annulus 36 is urged towards spacer 34 by an engage means shown herein as helical compression spring 38. Spring 38 fits in an annular groove 40 in the cap 10.

Referring to FIGS. 3-5, previously illustrated spacer 34 is shown in further detail. As illustrated, in FIG. 3, annulus 36 is positioned atop spacer 34 and has a greater outside diameter. Spacer 34 has a cylindrical exterior contiguous to a frustro-conical exterior. As shown herein, spacer 34 has three notches 42 spaced 120° apart. (In FIG. 2 two balls are shown in two starts, but only for illustrative purposes.) Of course, in embodiments having two, four or a different number of balls and starts, there will be a corresponding number of notches in spacer 34.

Referring to FIG. 6, shaft 18 is shown with its groove 20 adjacent to race 30. Ball 32 rests both inside groove 20 and against the sloping surface of race 30. Spacer 34 embraces ball 32 and has overhead clearance from annulus 36 to allow free rotation of spacer 34 and balls 32. Annulus 36 does not have much room to travel, since large movements are unnecessary. Spacer 34 and annulus 36 need only to be able to move upward sufficiently so that ball 32 can skip between grooves.

FIG. 7 gives details of the seating of ball 32 in groove 20. Angle B between the contact point on race 30 to the nearest outside contact point in groove 20 is less than 180°. If angle B were 180° or more, ball 32 could fall out of groove 20. However as shown, ball 32 is trapped and will act as a rider to engage groove 20 and turn shaft 18. To ensure definite seating, the radius of groove 20 is made less than that of ball 32. Thus groove 20 engages ball 32 on the groove edges. To ensure that angle B is less than 180°, groove 20 and race 30 must be carefully dimensioning with this objective in mind. Preferably, race 30 will be relatively steep and its inclination angle A will be around 30°. If angle A is excessively large, ball 32 will not remain trapped in groove 20. Also, groove 20 must be sufficiently deep to insure that angle B is sufficiently small to keep ball 32 trapped.

In order to facilitate an understanding of the principles associated with the foregoing apparatus, its operation will be briefly described. The hand tool of FIG. 2 is first positioned with bit 24 in aperture A of workpiece W. The handle 10, 12 is pushed towards workpiece W so that shaft 18 retracts into handle 10, 12, compressing spring 26. As this happens, balls 32 are lifted by grooves 20. Note when shaft 18 retracts, balls 32 easily lift spacer 34 causing it to frictionally engage annulus 36, which allows balls 32 to skip grooves, but prevents spacer 34 from turning. Thus shaft 18 does not turn when retracting and balls 32 do not tend to jam. Subsequently, spacer 34 actually lifts annulus 36, which compresses spring 38. As the operator continues to press handle 10, 12 towards workpiece W, balls 32 continue to skip over grooves 20. When the operator reverses retraction, the force exerted by spring 26 is at its maximum for this stroke. Consequently, bit 24 bears against aperture A with the maximum force.

Thereafter, the operator allows handle 10, 12 to lift. As a result, balls 32 catch grooves 20 and are driven down along the converging surfaces of race 30. The downward movement of balls 32 is ensured by spring 38 which brings annulus 36 to the position illustrated in FIG. 2. At this point, excessive downward pressure by spacer 34 is impossible because of the clearance between it and annulus 36. As shaft 18 extends out of handle 10, 12, balls 32 roll in grooves 20 and on race 30. Therefore, shaft 18, shank 22 and bit 24 turn. As the shaft 18 extends, spring 26 extends as well to reduce the pressure on bit 24. This reduction in force advantageously reduces the propensity for gouging by bit 24. Therefore, at the end of the stroke, bit 24 has relatively light pressure, which is useful for smoothing the aperture A, as opposed to cutting into it. In the preferred embodiment, a full stroke of shaft 18 is about two inches and during the stroke the bit 24 turns twice. In the preferred embodiment, bit 24 is in the nature of a countersink bit and therefore countersinks or chamfers the outside of aperture A.

It is to be appreciated that various modifications may be implemented with respect to the above described embodiments. For example in some embodiments the number of starts in the shaft can be altered depending upon the desired strength and stability. Also, the overall dimension can be changed depending upon the size of the apertures being deburred and the forced required. Furthermore, while variously shaped cavities are shown for holding springs, in some embodiments the spring may be attached in an open area. Additionally, the bit can be either integral or can be secured to a shank by a screw, threads or other means. Also, the length of the tool stroke and the number of turns accomplished by the tool can be altered depending upon the desired coarseness of the deburring operation.

Obviously, many modification and variations of the present invention are possible in light of the above teachings. It is therefore to be understood that within the scope of the appended claims, the invention may be practiced otherwise than as specifically described.

I claim:

1. A hand tool for removing burrs from an aperture in a workpiece, comprising:
   a hollow handle having a race;
   a shaft rotatably mounted in said handle to reciprocate axially therein;
   thrust means for urging said shaft to extend axially;
   rolling means mounted in said race in said handle for engaging and rolling on said race and on said shaft to rotate said shaft as it extends axially from said handle, said rolling means being operable to allow axial retraction of said shaft into said handle without rotation; and
   a deburring bit mounted at an outer end of said shaft, so that said bit turns when said shaft extends as said handle withdraws from said workpiece.

2. A hand tool according to claim 1 wherein aid thrust means is operable to apply less force to extend said shaft as it extends further from said handle.

3. A hand tool according to claim 2 wherein said shaft has at least one spiral groove, said rolling means comprising:
   a plurality of balls mounted in said handle to engage at least said one spiral groove.

4. A hand tool according to claim 3 wherein said race is frustro-conical and encircles said shaft, said balls being mounted in said race said rolling means comprising:
   holding for urging said balls along said frustro-conical race in a direction to converge with said shaft, said holding means being operable to allow at least one of said balls to skip said spiral groove as said shaft retracts into said handle, so that said shaft turns when said shaft extends as said handle withdraws from said workpiece.

5. A hand tool according to claim 4 wherein said groove of said shaft comprises two separate starts.

6. A hand tool according to claim 4 wherein said balls are at least three in number and wherein said groove of said shaft comprises three separate starts.

7. A hand tool according to claim 6 wherein said holding means comprises:
   an annular holder encircling said shaft for axially sliding toward said balls no closer than a holding position in which said balls have a predetermined axial clearance.

8. A hand tool according to claim 7 wherein said annular holder comprises:
   a tapered annular spacer having equiangularly spaced notches sized to hold one of said balls 9. A hand tool according to claim 8 wherein said handle has an annular shelf larger than and adjacent to said race, said annular holder further comprising:
   an annulus coaxially mounted at said shelf adjacent said spacer; and
   an engage means for urging said annulus toward said spacer, said annulus being sized to prevent its entry into said race.

10. A hand tool according to claim 9 wherein said spiral groove is right handed.

11. A hand tool according to claim 3 wherein the conical angle of said race and the depth of said groove is sized to make no greater than obtuse the angle in an axial plane about the ball center between the points of ball contact with said race and the further edge of said nearest groove, when the ball is touching said race and is fully seated in said groove.

12. A hand tool according to claim 1 wherein the force from the thrust means on said deburring bit when it is turning, is modified by the rotational pitch applied to said shaft by said rolling means and urges said shaft axially with a force appropriate for deburring said aperture in said workpiece without boring.

13. A hand tool according to claim 1 wherein the rolling means is arranged to cause one to three turns of said shaft per cycle.

14. A hand tool for dressing a workpiece, comprising:
   a shaft having at least one spiral groove;
   a hollow handle for rotatably supporting said shaft and for allowing it to reciprocate axially therein, said handle having a frustro-conical race encircling said shaft;
   a plurality of balls mounted in said race to engage at least said one spiral groove;
   thrust means for urging said shaft to extend axially;
   holding means for urging said balls along said frustro-conical race in a direction to converge with said shaft, said holding means being operable to allow at least one of said balls to skip said spiral groove as said shaft retracts into said handle, so that said shaft turns when said shaft extends as said handle withdraws from said workpiece.

* * * * *